United States Patent [19]

Hertrich

[11] 3,749,925

[45] July 31, 1973

[54] OPTO-ELECTRONIC TRANSDUCER FOR POSITION INITIALIZATION OF A LINEAR MOTION MECHANISM

[75] Inventor: Friedrich R. Hertrich, Boulder, Colo.

[73] Assignee: Iomec, Inc., Santa Clara, Calif.

[22] Filed: Dec. 1, 1971

[21] Appl. No.: 203,724

[52] U.S. Cl. .......... 250/237 G, 250/231 SE

[51] Int. Cl. .......... H01j 5/16

[58] Field of Search .......... 250/219 D, 219 DD, 250/229, 231 R, 231 SE, 237 R, 237 G; 356/139, 169; 235/61.11 E

[56] References Cited

UNITED STATES PATENTS

| | | | |
|---|---|---|---|
| 3,187,187 | 6/1965 | Wingate | 250/231 SE X |
| 3,671,755 | 6/1972 | Hovius | 250/237 |
| 3,487,399 | 12/1969 | Wogatzke | 250/237 |
| 3,427,463 | 2/1969 | Weyrauch | 250/237 |
| 3,326,077 | 6/1967 | Vandermeer | 250/231 SE X |
| 3,046,541 | 7/1962 | Knox | 250/231 SE |
| 3,253,153 | 5/1966 | Stoddard | 250/231 |
| 3,454,777 | 7/1969 | Marcus | 250/237 |

*Primary Examiner*—James W. Lawrence
*Assistant Examiner*—D. C. Nelms
*Attorney*—Townsend and Townsend

[57] ABSTRACT

An opto-electronic transducer system for initializing the position of a linear motion mechanism such as the moving-head actuator in a magnetic disc file memory unit. A shuttering mechanism responsive to actuator movement is interposed between a light source and an aligned pair of spaced photodetectors. The shuttering mechanism comprises two relatively laterally movable elements appropriately masked to modulate the light beam received by each photodetector in such a manner that their output difference signal exhibits one or more sharply defined initial transitions through null value as the actuator reaches the initializing position. Occurrence of this reliably detectable initial zero crossing is used to generate a control signal indicating arrival of the read-write head over a predetermined radial index position on the disc at which the track count is to be started.

11 Claims, 4 Drawing Figures

INVENTOR.

FRIEDRICH R. HERTRICH

Townsend and Townsend

ATTORNEYS

INVENTOR.
FRIEDRICH R. HERTRICH
BY
Townsend and Townsend
ATTORNEYS

OPTO-ELECTRONIC TRANSDUCER FOR POSITION INITIALIZATION OF A LINEAR MOTION MECHANISM

The present invention relates to position control of linear motion mechanisms and is more particularly directed to an opto-electronic transducer system for initializing the position of a linear motion actuator with respect to a predetermined index point along its path of motion. The invention is particularly well adapted for track count initialization in a magnetic disc file memory system in order to accurately position the read-write head over an addressed track.

High performance direct access disc file systems are commonly used in conjunction with modern data processing equipment as large capacity auxiliary memories. Disc file systems of the moving-head type require highly accurate positioning of the read-write head at a precise radial location over the disc corresponding to an addressed track. In order to consistently achieve the required degree of precision, the linear position transducer must perform the functions of track initialization and counting, as well as direction sensing.

Position information is typically derived in these systems by illuminating a pair of photosensitive devices such as photodiodes or phototransistors with a modulated light beam in order to generate a position signal. The light beam which may be visible or infrared is emitted either from an incandescent or solid state light source and is modulated by a shuttering mechanism generally comprising a stationary mask and a shutter attached to the moving actuator which carries the read-write head.

The mask and shutter are opaque and are each formed with a number of light transmitting illumination slits. In conventional transducers these illumination slits are arranged so that the outputs of the two photosensors are separated by a constant phase angle of 90°. This produces the necessary information for track counting, as well as for direction sensing. However, in existing systems this mechanism is unsuitable for use in count initialization for the following reasons.

In order to provide a reference for starting the count, it is common practice to sense an abrupt transition from a dark to a bright field or vice versa at a predetermined index point. The sensors used for track counting, however, are masked in such a way that several lines (dark or bright) are sensed simultaneously. This technique allows inaccuracies in the location of particular slits to be averaged and increases the amount of light being sensed. However, due to such inaccuracies, this integration effect normally produces a very broad signal transition region which is inadequate for precise count initialization. Conventional systems therefore typically employ a third photosensor which detects only a sharply defined transition from a dark to a bright field or vice versa at the index point. In the case of relatively high line densities, however, it becomes extremely difficult to produce a sharply defined signal transient for count initialization because of the finite size of the third photosensor and the amount of light it requires for producing reliably detectable signal level changes.

Accordingly, it is an object of the present invention to provide a track position indicating system wherein count initialization is achieved using the same photodetector pair used for track counting and direction sensing. It is an advantage of this arrangement that no additional sensor or associated circuitry is required. Also, the location and size of the masking patterns used for initialization are not confined to the precise pitch required by the positioner in the normal counting mode. As a result, the normally encountered tolerance problems are greatly diminished at a potential saving in cost.

Additional objects, features and advantages of the present invention will be more readily apparent after reading the following detailed description with reference to the accompanying drawings, wherein.

Figures 1, 2:
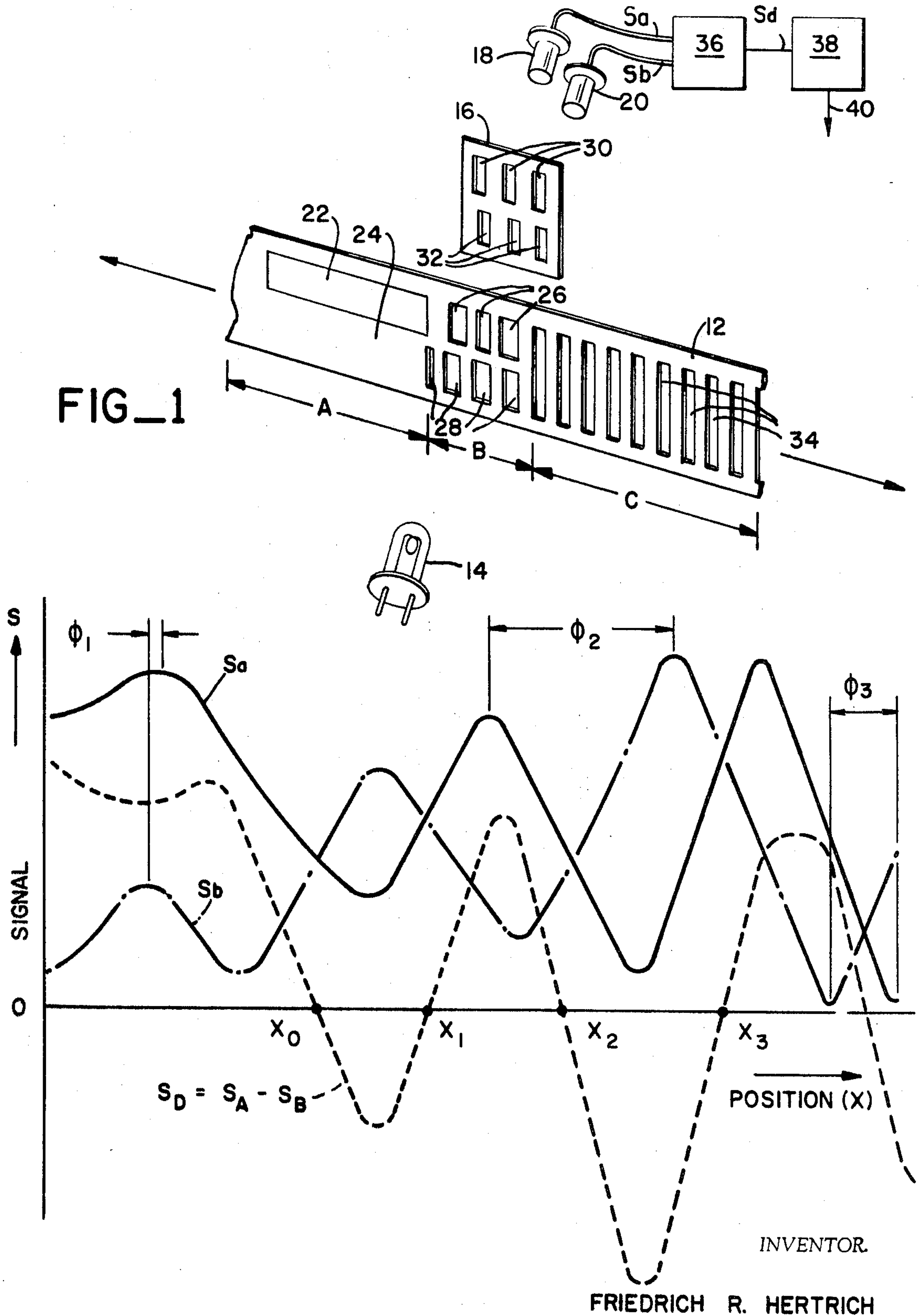
FIG. 1 is a pictorial representation of the transducer system of the present invention illustrating the light source, shutter mechanism, photodetectors, and electronic signal processing units.
FIG. 2 is a graphical representation of the relationship between the amplitude and phase of the output signals from the two photodetectors along with the resulting difference signal.

Referring now to the drawings, FIG. 1 depicts a position transducer having a shutter 12 mounted to the reciprocally movable read-write head actuator of a magnetic disc file unit (not shown). Shutter 12 is formed with a number of translucent or transparent areas shown in FIG. 1 as rectangular apertures. The body of shutter 12 surrounding these light transmitting areas is opaque. It will be appreciated that these areas need not be formed by physically cutting openings in the shutter but may be produced by various techniques of photoetching well known to those skilled in the art. In applications requiring a high degree of precision such as in the magnetic disc drive under discussion, these latter techniques of illumination slit formation are especially suitable for producing the necessary high line densities.

Light source 14 produces substantially parallel light which passes through both shutter 12 and stationary mask 16 before reaching vertically spaced photodetectors 18 and 20. In FIG. 1 light source 14 as well as mask 16 and photodetectors 18 and 20 are mounted on the stationary disc drive housing while shutter 12 is mounted to the actuator. Alternatively, light source 14, mask 16 and photodetectors 18 and 20 could be mounted to and movable with the actuator while shutter 12 would be attached to the stationary housing. In either case the light from source 14 passes through the apertures in mask 16 and impinges on the pair of photodetectors on the opposite side of the mask while shutter 12 moves relative to the light source and mask in a plane parallel to the mask. The relative movement of mask and shutter appropriately modulates the light beam to include position and direction information.

The light transmitting areas in shutter 12 and mask 16 can be thought of as being distributed among two sPaced rows or sensing channels, each in alignment with a corresponding one of photosensors 18 and 20. The illumination slits in shutter 12 are further arranged in three different groups or configurations designated in FIG. 1 as zones A, B and C. Zone A occupies the portion of shutter 12 adjacent its edge which is radially interior with respect to the center of the magnetic disc with which the unit is associated. This edge of shutter 12 will be referred to as the leading edge, and the radially exterior edge as the trailing edge.

Shutter zone A includes a single, continuous translucent band in the upper photodetector sensing channel formed by window 22 extending longitudinally along the channel and a continuous opaque band 24 in the lower photodetector sensing channel formed by the body of shutter 12.

The light-transmitting areas in zone B of shutter 12 are arranged so that the vertical central axes of the illumination slits 26 in the upper channel are all longitudinally offset or phase-displaced with respect to the vertical central axes of the slits 28 in the lower channel. The particular relative dimensions of the individual slit widths and inter-slit spacings in this region of shutter 12 are determined on the basis of considerations discussed below.

The illumination slits in zone C of shutter 12 are arranged so that the upper and lower photodetector channel positions are vertically aligned having no offset or phase differential. In the embodiment shown in FIG. 1, a single vertical slit 34 occupies both the upper and lower channel positions. As a result, when shutter zone C is moved across the light path from source 14, the amplitude of the light intensity impinging on photodetectors 18 and 20 will have a phase relationship determined solely by the slit arrangement on mask 16.

The illumination slits in mask 16 are formed with uniform slit width and inter-slit spacing. The upper channel slits 30 are longitudinally offset with respect to the lower channel slits 32 by a distance of one-fourth of the slit pitch defined as the distance from the leading edge of one slit to the leading edge of the next successive slit. This arrangement produces a relative phase displacement between the two channels of 90°. Accordingly, when shutter zone C is moved between light source 14 and mask 16, the photodetector output signals $S_A$ and $S_B$ from photodetectors 18 and 20, respectively, will have a corresponding relative phase displacement of 90°. This quadrature phase differential is used for regular positioning of the actuator by track counting and direction sensing according to techniques well known in the art.

It will be noted that mask 16 includes three illumination slits 30 in the upper channel and three illumination slits 32 in the lower channel. Thus, upper photodetector 18 will be exposed to the cumulative effect of light passing through each of the three slits 30 while lower photodetector 20 will be exposed to light passing through each of the three lower slits 32.

The purpose for masking the photosensors to receive light through three longitudinally spaced "windows" simultaneously is to allow inaccuracies in the location of particular slits to be averaged and to increase the total amount of light being sensed. However, this superposition of optical information while allowing accurate position control in the normal track counting mode is generally unsuitable for precise count initialization which depends on a sharply defined signal transition. This results from the fact that when errors in slit placement do occur, the photodetector output signal from the affected channel will be "smeared" meaning that the slope of the output signal will decrease, flattening the waveform.

According to the present invention, reliable count initialization is achieved by arranging the illumination slits in the initializing region of shutter 12 such that the difference signal $S_D$ based on a comparison of the two photodetector output signals $S_A$ and $S_B$ undergoes one or more sharply defined initial transitions through zero as the leading edge of the shutter reaches the actuator initializing position from a radially exterior direction (FIG. 2). This transition through null value will be most reliably detectable when the slope and amplitude of the difference signal on either side of the null are as large as possible. This occurs when $S_A$ and $S_B$ are 180° out of phase with one another in the idealized situation. In order to optimize the signal in a specific case, minor adjustments in slit width and spacing in zone B should be made to maintain the output signal phase offset near 180°. This is necessary for eliminating or reducing the effects of optical contamination of the light path, system noise and other error introducing variables particular to any given system.

As illustrated in FIG. 2, the relative phase displacement between the individual photodetector output signals $S_A$ and $S_B$ has a value $\phi_1$ which is near zero at the starting position (near the leading edge of zone B), increasing to substantially 180° at $\phi_2$ and finally decreasing to 90° at $\phi_3$ in the normal count operating area (near the trailing edge of zone B). If count initialization is performed using the difference signal $S_D$ in the area of 180° phase offset between the component signals $S_A$ and $S_B$, the best signal will be achieved in spite of any smearing effect on the photodetector outputs due to inaccuracies in slit formation.

By suitably arranging the illumination slits in the initializing region of shutter 12, the first several zero transitions of the difference signal as the read-write head approaches the disc index point from a radially exterior position will occur in the 180° phase offset area. Selection of one of these initial transitions as the initializing point will therefore allow consistently reliable position initialization. The first zero crossing $X_0$ may be chosen as the initializing point for purposes of circuitry simplification. However, any of the several succeeding null value positions $X_1$, $X_2$, $X_3$, etc. (FIG. 2) can be selected to optimize the sharpness of the signal transition. For example, in FIG. 2, the sharpest transition of the difference signal $S_D$ through null value occurs at $X_2$, since the difference signal undergoes the greatest change in amplitude in the vicinity of this point.

The basic requirement for disposition of the illumination slits in the transition area of the shutter is the combination of a continuous bright field in one channel with a continuous dark field in the other channel (zone A) followed by a region where the slits in the two channels are offset with respect to each other in an orientation tending to produce 180° phase-displaced output signals.

Figure 3:
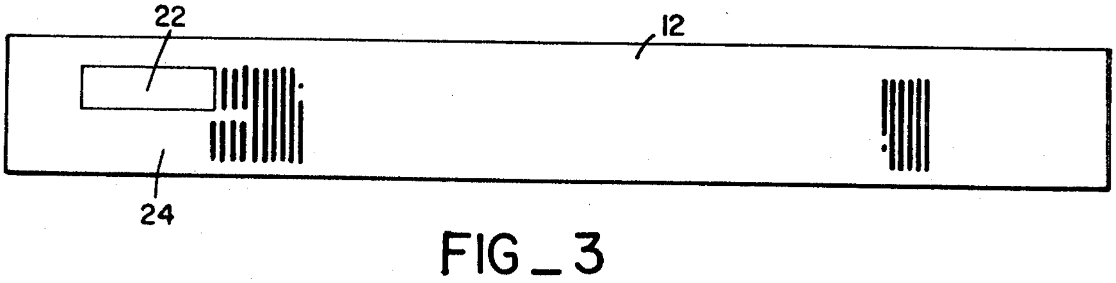
FIG. 3 is a diagrammatic representation of a shutter according to a preferred embodiment.
Figure 3A:
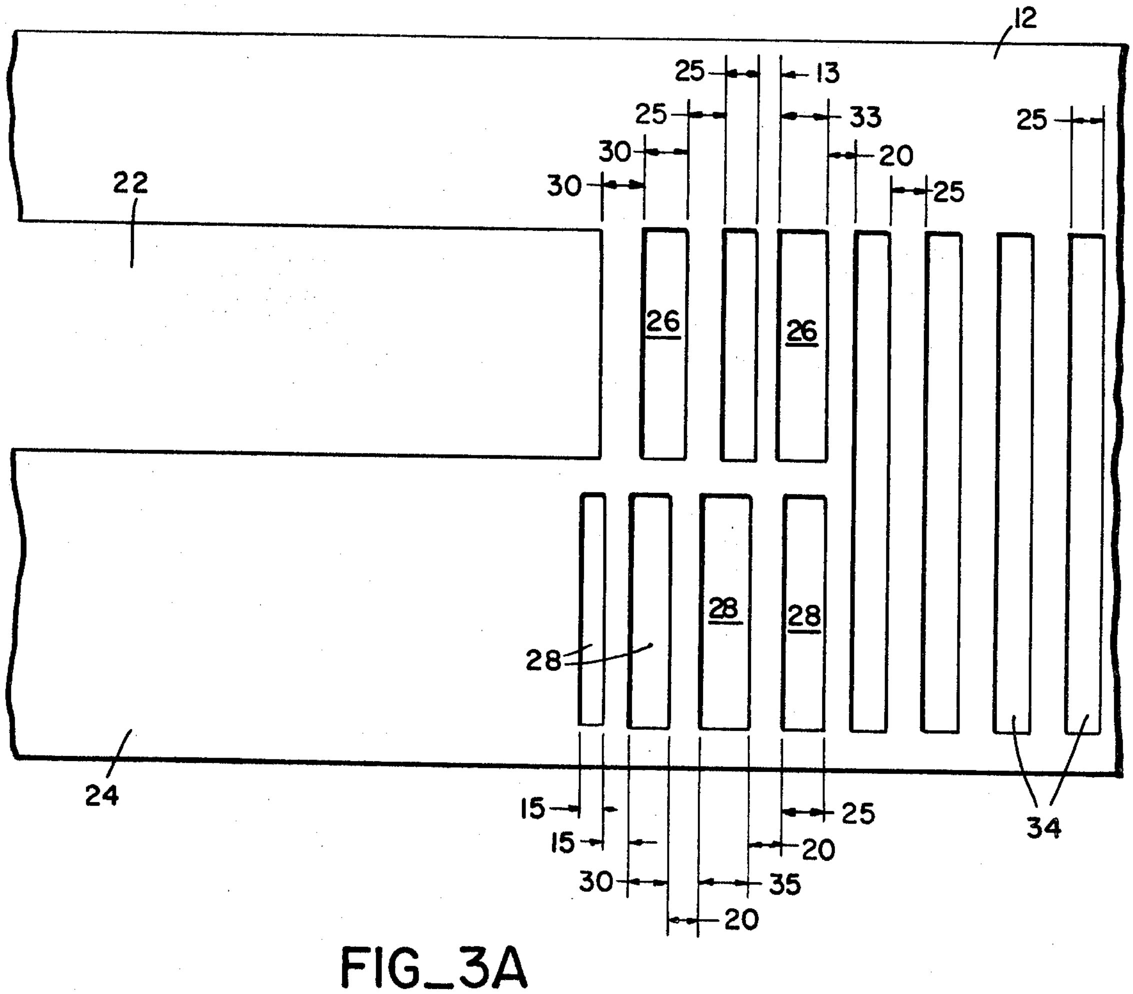
FIG. 3*a* is an enlarged detail of the initializing zone of the shutter of FIG. 3 showing the relative dimensional proportions of the slit configuration.

While various combinations of individual slit widths and inter-slit spacing within zone B will produce a difference signal having suitably sharp initial null value transitions, it has been found that the slit configuration depicted in FIG. 3 provides particularly superior results.

Referring back to FIG. 1, the photodetector output signals $S_A$ and $S_B$ are applied to the input of circuit 36 which forms an output signal $S_D$ proportional to the difference between the instantaneous values of $S_A$ and $S_B$. Difference signal $S_D$ is then applied to the input of circuit 38 which outputs a control signal 40 when $S_D$ first exhibits a transition through zero value. Alternatively circuit 38 can be readily designed to select the second, or any succeeding zero crossing to optimize control.

What is claimed is:

1. A position initialization and count transducer system for indicating the passage of a predetermined index point along the path of travel of a linear motion mechanism having a stationary element and a movable element comprising: a light source mounted to one of said moving and stationary elements; a spaced pair of photodetectors mounted to said one element in light receiving relationship to said light source; a shuttering mechanism responsive to the movement of said movable element interposed between said light source and said photodetectors for modulating the light incident thereto;

first circuit means coupled to said photodetectors for providing a signal representative of the difference between the outputs of said photodetectors;

said shuttering mechanism including a pair of modulation channels each associated to a different one of said pair of photodetectors for individually modulating the light incident thereto, each said modulation channel including a position initialization zone for enabling said first circuit means to generate a plurality of sharply defined initial transitions through null value as the leading edge of said movable element passes said index point and a counting zone for enabling said first circuit means to generate count signals for indicating the advance of said movable element past said index point; and second circuit means coupled to said first circuit means for providing a position initialization control signal in response to one of said initial transitions.

2. The system of claim 1 wherein said second circuit means provides said control signal when said difference signal undergoes an Nth null value transition where N is an integer.

3. The system of claim 1 wherein said shuttering mechanism comprises a shutter with leading and trailing edges mounted to said movable element and a parallel mask mounted to said stationary element, said shutter being opaque and having formed therein a plurality of light transmitting areas disposed longitudinally along said shutter in two transversely spaced sensing channel positions in respective alignment with each of said photodetectors to form said pair of modulation channels, said position initialization and said counting zones being further arranged in longitudinally successive manner along said shutter, said mask also having a plurality of light transmitting areas disposed longitudinally along said mask in two transversely spaced channel positions in respective alignment with said photodetectors.

4. The system of claim 3 further including a first zone proximate the leading edge of said shutter having a continuous light-transmitting illumination band extending longitudinally along one of said sensing channels and a continuous opaque band extending longitudinally along the other of said channels; and wherein said position initialization zone is located adjacent said first zone and comprises a plurality of illumination slits in each of said sensing channels with the slits in one channel being in offset orientation with respect to the slits in the other channel; and said counting zone is located between said second zone and the trailing edge of said shutter and comprises a single row of illumination slits each of which occupies both of said channel positions.

5. The system of claim 4 wherein the slits in both channels of said position initialization zone have a nonuniform pitch, width and spacing.

6. The system of claim 4 wherein said illumination slits in both said channels of said position initialization zone are offset to produce photodetector output signals substantially 180° out of phase with each other.

7. The system of claim 3 wherein the light transmitting areas in said mask comprise a plurality of illumination slits in each of said channels, said slits having a uniform pitch, width and spacing in both of said channels with the slits in one channel being longitudinally offset relative to the slits in the other channel an amount equal to one-quarter of the slit pitch to produce a 90° relative phase displacement.

8. In an optoelectronic position transducer for a linear motion mechanism having movable and stationary elements and wherein said transducer includes a shuttering mechanism responsive to the movement of said movable element for modulating a light beam impinging on a spaced pair of photosensors to output 90° phase displaced signals therefrom, the improvement comprising: means for initializing the position of said movable element with respect to a predetermined index point, said means including a shutter mounted to said movable element, said shutter being opaque and having formed therein a plurality of light transmitting areas disposed in first and second transversely spaced sensing positions respectively aligned with said photosensors, said areas being further arranged in differing configurations in each of three longitudinally successive zones along said shutter, the first of said zones being located proximate the leading edge of said shutter and having a continuous light transmitting band in said first sensing position and a continuous opaque band in said second sensing position, the second of said zones being located adjacent the first of said zones and having a plurality of illumination slits in said first and second sensing positions with the slits in one of said positions being longitudinally offset from the slits in the other of said positions to cause said output signals to be substantially 180° out of phase, the third of said zones being located between said second zone and the trailing edge of said shutter and having a plurality of illumination slits extending across both of said sensing positions;

a mask mounted to said stationary element between said shutter and said light source and having a plurality of illumination slits formed therein in first and second transversely spaced sensing positions respectively aligned with said photosensors with the slits in one of said positions being 90° longitudinally phase displaced from the slits in the other of said positions;

first circuit means responsive to said photosensor output signals for generating a signal proportional to the difference therebetween; and second circuit means responsive to said difference signal for generating an initializing control signal when said difference signal undergoes an initial transition through null value as the leading edge of said movable element reaches said index point.

9. An opto-electronic system for initializing the position of a linear motion mechanism having movable and stationary elements comprising: a shutter mounted to said movable element, said shutter being opaque and having formed therein a plurality of light-transmitting apertures disposed along two spaced channel positions on said shutter, said apertures being further arranged in three configurations in successive zones along said shutter, said zones including a first zone having a continuous light-transmitting illumination band extending longitudinally along one of said channels and a continuous opaque band extending longitudinally along the other of said channels, a second zone having a plurality of illumination slits in each of said channels with the slits in each channel being longitudinally offset from the slits in the other channel, said slits in both channels of said second zone having a non-uniform pitch, width-,and spacing, and a third zone comprising a single row of illumination slits each of which occupies both of said channel positions;

a mask mounted to said stationary elements, said mask being opaque and having a plurality of light-transmitting illumination slits disposed along two spaced channel positions on said mask in channel registration with the illumination slits in said shutter;

a light source mounted on said stationary element on one side of said shutter and mask;

a spaced pair of photosensors mounted on said stationary element on the other side of said shutter and mask, each of said photosensors being aligned with a corresponding channel in said shutter and mask;

means responsive to the output signal of said photosensors for generating a difference signal based thereon;

and means responsive to said difference signal for generating a control signal indicative of position initialization upon the occurrence of an initial null value of said control signal.

10. The method of initializing the linear position of a reciprocal motion actuator wherein a shuttering mechanism responsive to actuator movement is interposed between a light source and aligned pair of photodetectors, comprising the steps of:

modulating the light beam impinging on said photodetectors with said shuttering mechanism to cause the output signals from said photodetectors to assume a 180° relative phase displacement as said actuator reaches the initializing position from a particular direction;

monitoring the phase and amplitude of said output signals and generating a signal proportional to the difference therebetween;

detecting the occurrence of an initial null value of said difference signal as said actuator reaches said initializing position; and generating an initializing control signal upon detection of said initial null value.

11. The method of initializing the position of a linear motion mechanism having moving and stationary elements comprising the steps of:

providing an opaque shutter mounted to said moving element, said shutter having a plurality of light transmitting areas disposed n two transversely spaced sensing channels extending along the length thereof, said areas being further arranged in three differing configurations in successive zones along said shutter, said zones including a first zone having a continuous light transmitting illumination band extending along one of said channels and a continuous opaque band extending along the other of said channels, a second zone having a plurality of illumination slits in each of said channel positions with the slits in each channel being longitudinally offset with respect to those in the other channel, said slits in both channels of said second zone having a non-uniform pitch, width, and spacing, and a third zone having a single row of illumination slits each of which occupies both of said channels;

providing an opaque mask mounted to said stationary element, said mask having a plurality of light transmitting illumination slits disposed in two transversely spaced sensing channels in channel alignment with the illumination slits in said shutter;

passing a light beam through said shutter and said mask as said shutter is moved relative thereto with said moving element;

detecting the phase and amplitude of said light beam passing through each of said channels with a pair of spaced photosensors respectively aligned with said sensing channels;

generating a control signal proportional to the difference between the output signals from said photosensors;

determining the occurrence of an initial null value of said control signal; and initializing the position of said movable element upon occurrence of said null value.

* * * * *